US012658518B2

(12) United States Patent (10) Patent No.: US 12,658,518 B2

Tan et al. (45) Date of Patent: Jun. 16, 2026

(54) BATTERY PACK AND VEHICLE HAVING SAME

(71) Applicant: BYD COMPANY LIMITED, Shenzhen (CN)

(72) Inventors: Liangwen Tan, Shenzhen (CN); Na Song, Shenzhen (CN); Jing Tan, Shenzhen (CN); Wenhui Chen, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 636 days.

(21) Appl. No.: 18/141,012

(22) Filed: Apr. 28, 2023

(65) Prior Publication Data

US 2023/0261305 A1 Aug. 17, 2023

Related U.S. Application Data

(63) Continuation of application No. PCT/CN2021/105761, filed on Jul. 12, 2021.

(30) Foreign Application Priority Data

Oct. 30, 2020 (CN) .......................... 202011194507.7

(51) Int. Cl.
H01M 50/289 (2021.01)
B60K 1/04 (2019.01)
(Continued)

(52) U.S. Cl.
CPC ............. H01M 50/262 (2021.01); B60K 1/04 (2013.01); H01M 10/6556 (2015.04);
(Continued)

(58) Field of Classification Search
CPC .... B60K 1/04; H01M 50/204; H01M 50/244; H01M 50/249; H01M 50/289; H01M 50/291
See application file for complete search history.

(56) References Cited

U.S. PATENT DOCUMENTS

| 2014/0166381 A1 | 6/2014 | Ling et al. |
| 2014/0284125 A1 | 9/2014 | Katayama et al. |

FOREIGN PATENT DOCUMENTS

| CN | 208093631 U | 11/2018 |
| CN | 208198085 U | 12/2018 |
| | (Continued) | |

OTHER PUBLICATIONS

International Search Report and Written Opinion for Application No. PCT/CN2021/105761, mailed on Oct. 12, 2021, 11 pages.

*Primary Examiner* — Kevin E Yoon
(74) *Attorney, Agent, or Firm* — Sheppard Mullin Richter & Hampton LLP

(57) ABSTRACT

A battery pack includes: a battery core; a bottom plate, where the bottom plate is disposed under the battery core to support the battery core; a top plate, where the top plate is disposed above the battery core; a mounting beam, where the mounting beam includes a main beam portion and a bottom beam portion, the main beam portion is located between the bottom plate and the top plate, and the bottom beam portion is connected to a lower surface of the main beam portion and disposed under the bottom plate; and a connection assembly, where the connection assembly is configured for mounting the battery pack to a mounting point, and the connection assembly couples with the mounting beam to provide the mounting beam an upward acting force when the battery pack is mounted to the mounting point.

18 Claims, 7 Drawing Sheets

(51) Int. Cl.

| | | |
|---|---|---|
| *H01M 10/6556* | (2014.01) |
| *H01M 50/209* | (2021.01) |
| *H01M 50/244* | (2021.01) |
| *H01M 50/249* | (2021.01) |
| *H01M 50/262* | (2021.01) |
| *H01M 50/291* | (2021.01) |

(52) U.S. Cl.
CPC ....... *H01M 50/209* (2021.01); *H01M 50/244* (2021.01); *H01M 50/249* (2021.01); *H01M 50/289* (2021.01); *H01M 50/291* (2021.01); *H01M 2220/20* (2013.01)

(56) References Cited

FOREIGN PATENT DOCUMENTS

| | | | | | |
|---|---|---|---|---|---|
| CN | 208393092 | U | | 1/2019 | |
| CN | 209544452 | A | | 10/2019 | |
| CN | 209544452 | U | | 10/2019 | |
| CN | 209747594 | U | | 12/2019 | |
| CN | 210191179 | U | | 3/2020 | |
| CN | 210379152 | U | | 4/2020 | |
| CN | 210837863 | U | | 6/2020 | |
| CN | 211265550 | U | | 8/2020 | |
| CN | 211265551 | U | | 8/2020 | |
| CN | 111653700 | A | | 9/2020 | |
| CN | 112310541 | A | * | 2/2021 | .............. B60K 1/04 |
| CN | 213768241 | U | | 7/2021 | |
| DE | 102015204841 | A1 | | 9/2016 | |
| JP | 2014099418 | A | | 5/2014 | |

* cited by examiner

BATTERY PACK AND VEHICLE HAVING SAME

CROSS-REFERENCE TO RELATED APPLICATIONS

This application is a Continuation application of International Patent Application No. PCT/CN2021/105761, filed on Jul. 12, 2021, which is based on and claims priority to and benefits of Chinese Patent Application No. 202011194507.7, filed on Oct. 30, 2020. The entire content of all of the above-referenced applications is incorporated herein by reference.

FIELD

The present disclosure relates to the technical field of battery packs, and more particularly, to a battery pack and a vehicle having same.

BACKGROUND

In the related art, a battery pack is fixed to a vehicle body through a connection device. The battery pack includes a mounting beam and a bottom plate. The mounting beam is connected above the bottom plate and is connected to the connection device. A battery core is supported on the bottom plate, and the battery core exerts a downward acting force on the bottom plate at this time. However, because the mounting beam located above the bottom plate is subjected to an upward acting force provided by the connection device, while the bottom plate is subjected to the downward acting force from the battery core, a problem of connection failure between the mounting beam and the bottom plate easily occurs.

SUMMARY

The present disclosure resolves at least one of the technical problems existing in the related art. In view of this, the present disclosure provides a battery pack. The battery pack solves a problem of the separation between a mounting beam and a bottom plate.

The present disclosure further provides a vehicle having the foregoing battery pack.

A battery pack according to an embodiment of a first aspect of the present disclosure includes: a battery core; a bottom plate, where the bottom plate is disposed under the battery core to support the battery core; a top plate, where the top plate is disposed above the battery core; a mounting beam, where the mounting beam includes a main beam portion and a bottom beam portion, the main beam portion is located between the bottom plate and the top plate, and the bottom beam portion is connected to a lower surface of the main beam portion and disposed under the bottom plate; and a connection assembly, where the connection assembly is configured for mounting the battery pack to a mounting point, and the connection assembly couples with the mounting beam to provide the mounting beam an upward acting force when the battery pack is mounted to the mounting point.

In the battery pack according to this embodiment of the present disclosure, the mounting beam is not completely located above the bottom plate, but includes the bottom beam portion located under the bottom plate. Therefore, a point at which the mounting beam exerts the acting force on the bottom plate is not located above the bottom plate, but is located under the bottom plate. As a result, instead of being separated from the mounting beam, the bottom plate is only more tightly connected to the mounting beam under the action of the gravity of the battery core, thereby improving reliability and effectiveness of the support of the mounting beam to the bottom plate, and improving firmness and stability of the matching between the mounting beam and the bottom plate.

In some embodiments of the present disclosure, there are multiple connection assemblies disposed at intervals along a length direction of the mounting beam.

In some embodiments of the present disclosure, the connection assembly includes a sleeve. The sleeve includes a sleeve portion and a bottom edge portion. The sleeve portion passes through the mounting beam along a vertical direction. The bottom edge portion is connected to a lower end of the sleeve portion and disposed under the bottom beam portion.

In some embodiments of the present disclosure, the sleeve has a boss, and the connection assembly further includes a connection member. The connection member includes a head portion and a rod portion. The head portion is connected to a lower end of the rod portion. The head portion is disposed under the boss. The rod portion extends through the sleeve and the top plate. An upper end of the rod portion extends above the top plate.

In some embodiments of the present disclosure, the connection assembly further includes a first sealing member, and the sleeve includes a connection portion. The connection portion is connected to an upper end of the sleeve portion and passes through the top plate. An outer diameter of the sleeve portion is greater than an outer diameter of the connection portion. The first sealing member is sleeved over the connection portion and sandwiched between the sleeve portion and the top plate.

In some embodiments of the present disclosure, the connection assembly further includes a nut located above the top plate. A part of an outer peripheral surface of the connection portion above the top plate has external threads. The nut is threaded with the connection portion.

In some embodiments of the present disclosure, the connection assembly further includes a second sealing member, and the second sealing member is located at the top of the nut and surrounds an inner hole of the nut.

In some embodiments of the present disclosure, a shielding portion is disposed at the top of the nut. The shielding portion is annular and located above the connection portion.

In some embodiments of the present disclosure, the connection assembly further includes a third sealing member. The third sealing member is sleeved on the rod portion and sandwiched between the head portion and the boss.

In some embodiments of the present disclosure, the bottom beam portion includes a center portion and an outer peripheral portion. The outer peripheral portion is disposed surrounding the center portion. A thickness of the center portion is greater than a thickness of the outer peripheral portion. The bottom edge portion is supported under the center portion.

In some embodiments of the present disclosure, the bottom beam portion further includes a transition portion. The transition portion is connected between the center portion and the outer peripheral portion. A thickness of the transition portion decreases in a direction from the center portion to the outer peripheral portion. A top surface of the center portion is flush with a top surface of the outer peripheral portion. A bottom surface of the center portion is connected to a bottom surface of the outer peripheral portion through a bottom surface of the transition portion.

In some embodiments of the present disclosure, the bottom beam portion has a recess on a top surface at an outer edge of the bottom beam portion. An outer side face of the recess is open. The bottom plate is disposed on and fixed to the recess.

In some embodiments of the present disclosure, the battery core is disposed on each side of the mounting beam in a width direction of the mounting beam.

In some embodiments of the present disclosure, the battery pack includes multiple side beams disposed surrounding the bottom plate. The multiple side beams are connected to the bottom plate to form a tray. The multiple side beams form a frame. The battery core and the mounting beam are disposed inside the frame.

In some embodiments of the present disclosure, the battery core is bonded to the bottom plate.

In some embodiments of the present disclosure, the top plate is a cold plate and is bonded to the battery core.

In some embodiments of the present disclosure, the mounting beam comprises a hollow beam and reinforcing ribs. Reinforcing ribs are disposed in the hollow beam, extend along a length direction of the mounting beam, and are disposed in the main beam portion at intervals along a vertical direction.

In some embodiments of the present disclosure, the bottom beam portion has a recess on a top surface at an outer edge of the bottom beam portion, and the bottom plate is disposed on and fixed to the recess.

In some embodiments of the present disclosure, the mounting beam further includes a top beam portion. The top beam portion is connected to an upper end of the main beam portion and disposed under the top plate. The sleeve portion extends along the vertical direction and passes through the mounting beam. The upper end of the sleeve portion is disposed under the top beam portion.

A vehicle according to an embodiment of a second aspect of the present disclosure includes a vehicle body and a battery pack, where the battery pack is the battery pack according to the embodiment of the first aspect of the present disclosure, and the connection assembly is connected to the vehicle body.

The battery pack of the embodiment of the first aspect is arranged/disposed in the vehicle according to the present disclosure, so that the overall performance of the vehicle is improved.

Some of the additional aspects and advantages of the present disclosure are to be provided in the following description, and become evident in the following description, or are understood through the practice of the present disclosure.

DETAILED DESCRIPTION

Figure 1:
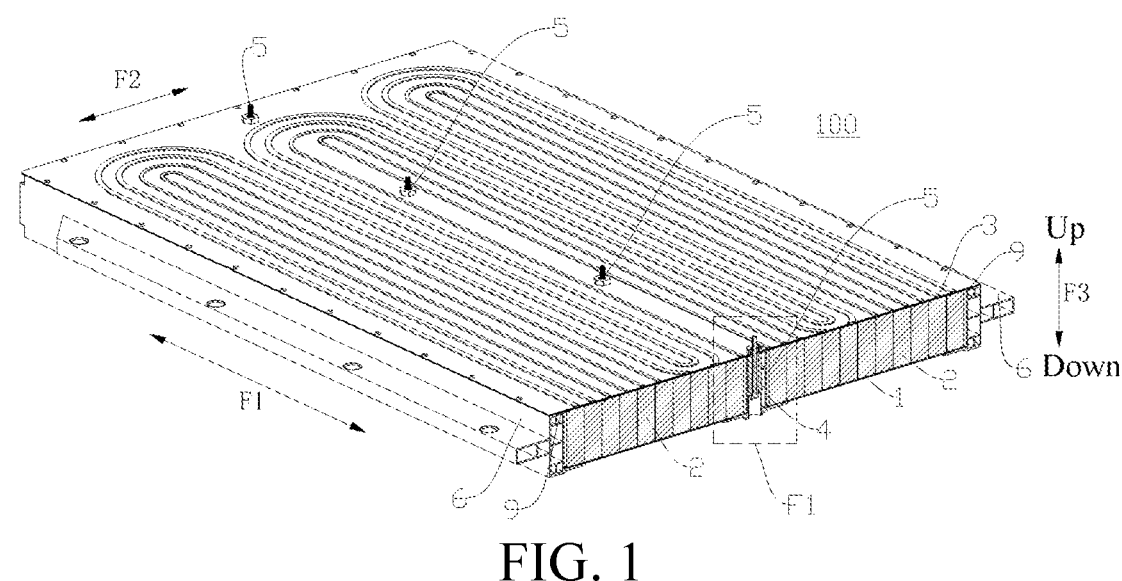
FIG. 1 is a sectional view of a battery pack according to an embodiment of the present disclosure.

Embodiments of the present disclosure are described in detail below, and are shown in the accompanying drawings. Same or similar reference numerals throughout the accompanying drawings indicate same or similar components or components having the same or similar functions. The embodiments described below with reference to the accompanying drawings are exemplary, are used only for explaining the present disclosure, and do not limit the present disclosure.

The disclosure below provides a number of different embodiments or examples used to implement different structures of the present disclosure. To simplify the disclosure of the present disclosure, components and arrangements of embodiments are described below. Certainly, the descriptions are only some of the embodiments and do not limit the present disclosure. In addition, reference numerals and/or reference letters may be repeated in different embodiments in the present disclosure. Such repetition is for purposes of simplification and clarity and is not indicative of relationships between the various embodiments and/or arrangements discussed. In addition, while the present disclosure provides embodiments of various processes and materials, a person of ordinary skill in the art may be aware of applicability of other processes and/or use of other materials.

A battery pack 100 according to an embodiment of a first aspect of the present disclosure is described below with reference to the accompanying drawings.

Figure 2:
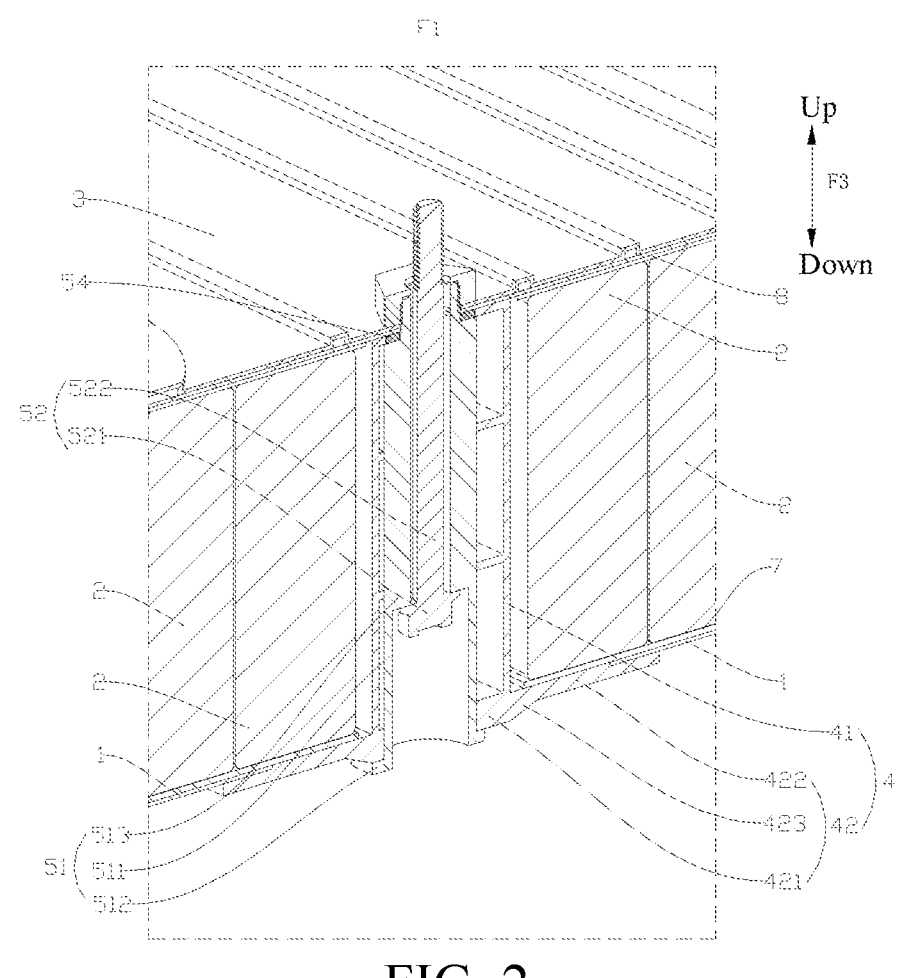
FIG. 2 is an enlarged view of F1 shown in FIG. 1.

As shown in FIG. 1, the battery pack 100 includes a bottom plate 1, a battery core 2, and a top plate 3. With reference to FIG. 2, the battery core 2 is arranged/disposed above the bottom plate 1, and the top plate 3 is arranged above the battery core 2. In other words, the top plate 3 is located above the bottom plate 1, and the battery core 2 is located between the top of the bottom plate 1 and the bottom of the top plate 3. The bottom plate 1 is arranged under the battery core 2 to support the battery core 2. It should be noted that, the orientation terms "up" and "down" herein are based on mounting of the battery pack 100 in an application scenario. For example, when the battery pack 100 is mounted on a vehicle body 200 of a vehicle 1000, an up and down direction or a vertical direction refers to an up and down direction of the vehicle 1000, that is, the top of the vehicle 1000 is "up", and the bottom of the vehicle 1000 is "down".

Figure 3:
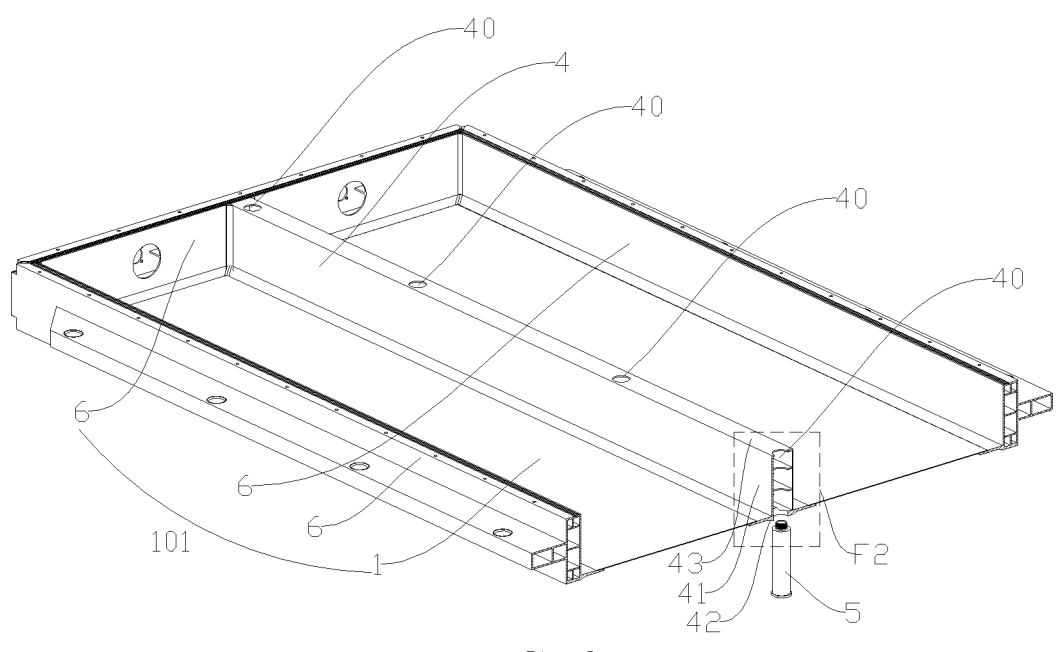
FIG. 3 is a sectional view of a tray shown in FIG. 1.

As shown in FIG. 2 and FIG. 3, the battery pack 100 further includes a mounting beam 4. The mounting beam 4 includes a main beam portion 41 and a bottom beam portion 42. The main beam portion 41 is located between the bottom plate 1 and the top plate 3. The bottom beam portion 42 is connected to a lower end of the main beam portion 41 and supported/disposed under the bottom plate 1. It should be noted herein that, that the bottom beam portion 42 is supported under the bottom plate 1 means that the bottom beam portion 42 is located under the bottom plate 1 to directly or indirectly support the bottom plate 1. In addition, it should also be noted that, in the description of the present disclosure, when a component "supports" another, the component may or may not be in contact with the another, and the component may or may not have a fixed connection relationship with the another.

As shown in FIG. 1 and FIG. 2, the battery pack 100 further includes a connection assembly 5. The connection assembly 5 is used for mounting the battery pack 100 to a mounting point in an application scenario. In other words, through the arrangement of the connection assembly 5, the battery pack 100 is connected to a mounting position in the application scenario. For example, when the battery pack 100 is applied to the vehicle 1000, the connection assembly 5 may be connected to the vehicle body 200 of the vehicle 1000. In this case, the mounting point is located on the vehicle body 200. However, it should be noted that, the application scenario of the battery pack 100 is not limited to the vehicle 1000, and there may be other application scenarios such as an unmanned aerial vehicle or an energy storage device.

As shown in FIG. 1 and FIG. 2, the connection assembly 5 matches/couples the mounting beam 4 so that the connection assembly 5 provides an upward acting force for the mounting beam 4 when the battery pack 100 is mounted to the mounting point in the application scenario. It should be noted that, a manner in which the connection assembly 5 matches the mounting beam 4 and provides an upward acting force for the mounting beam 4 when the battery pack 100 is mounted to the mounting point in the application scenario is not limited. For example, the connection assembly 5 may be clamped to, plugged in, lapped to, in interference fit with, threaded to, welded to, or fixedly connected by a connection member to the mounting beam 4. Details are not described herein. In addition, relative positions of the connection assembly 5 and the mounting beam 4, the bottom plate 1, and the top plate 3 are not limited. For example, the connection assembly 5 may be located between the bottom plate 1 and the top plate 3, or may pass downward out of the bottom plate 1, or may passes upward out of the top plate 3. Details are not described herein.

In an embodiments, through the arrangement of the connection assembly 5, the battery pack 100 may be connected in the application scenario, so that mounting of the battery pack 100 is implemented or the mounting stability of the battery pack 100 is improved. For example, in some embodiments of the present disclosure, when the battery pack 100 is mounted to the vehicle 1000, the connection assembly 5 may be connected to a frame of the vehicle body 200. In this case, if the battery pack 100 is also connected to the vehicle body 200 through another mounting structure, the mounting stability of the battery pack 100 can be improved through the arrangement of the connection assembly 5. If the battery pack 100 is no longer connected to the vehicle body 200 through another mounting structure, lifting of battery pack 100 can be achieved through the arrangement of the connection assembly 5.

Therefore, in the battery pack 100 according to this embodiment of the present disclosure, because the mounting beam 4 includes the bottom beam portion 42 supported/disposed under the bottom plate 1, the bottom plate 1 is located above the bottom beam portion 42. In this case, when the connection assembly 5 is connected to the mounting point (for example, the vehicle body) in the mounting scenario, under the action of the self-gravity of the battery core 2 and another structural member of the battery pack 100, the connection assembly 5 provides an upward acting force for the mounting beam 4. In this case, the mounting beam 4 can provide a supporting force for the bottom plate 1 located above it through the bottom beam portion 42, thereby improving support reliability of the mounting beam 4 to the bottom plate 1, improving the firmness and the stability of the matching between the mounting beam 4 and the bottom plate 1, and avoiding the separation of the mounting beam 4 from the bottom plate 1.

In some embodiments of the present disclosure, the battery core 2 is bonded to the bottom plate 1, for example, by a structural adhesive 7 shown in FIG. 2. Therefore, under the downward action of the gravity and the like of the battery core 2, the battery core 2 exerts a downward force on the bottom plate 1 to press the bottom plate 1 tightly against the mounting beam 4, thereby ensuring the reliability of the matching/coupling between the mounting beam 4 and the bottom plate 1. In addition, through the bonding of the battery core 2 and the bottom plate 1, the bottom plate 1 can reliably support the battery core 2.

In some embodiments of the present disclosure, the top plate 3 is a cold plate and is bonded to the battery core 2, for example, by a thermally conductive adhesive 8 shown in FIG. 2. Therefore, a temperature of the battery core 2 may be adjusted through the top plate 3 to ensure the reliable operation of the battery pack 100. Therefore, the mounting beam 4 provides an upward acting force for the bottom plate 1, thereby effectively avoiding a problem of bonding failure caused by the downward detachment of the battery core 2 relative to the top plate 3.

In the related art, some battery packs do not have a mounting beam, a connection device for connecting to a vehicle body is directly fixed to a top plate, and under the action of the self-weight of a battery core, the battery core transfers the downward acting force to the top plate. In this case, the connection device provides an upward acting force for the top plate, causing a bonding failure between the top plate and the battery core, and leading to a problem of detachment of the battery core relative to the top plate. To resolve the technical problem, in some other battery packs in the related art, mounting beams are arranged, but the mounting beams are all located above the bottom plates, and are fixed to the bottom plates by welding or bonding or in other manners. In this case, the battery core exerts a downward acting force on the bottom plates. However, the mounting beams located above the bottom plates are subjected to an upward acting force provided by the connection device, while the bottom plates are subjected to the downward acting force from the battery core, easily resulting in a problem of connection failure between the mounting beams and the bottom plates.

In the battery pack 100 according to this embodiment of the present disclosure, the mounting beam 4 is not completely located above the bottom plate 1, but includes the bottom beam portion 42 located under the bottom plate 1. Therefore, a point at which the mounting beam 4 exerts the acting force on the bottom plate 1 is not located above the bottom plate 1, but is located under the bottom plate 1. As a result, instead of being separated from the mounting beam 4, the bottom plate 1 is more tightly connected to the mounting beam 4 under the downward action of the gravity of the battery core 2, thereby improving the reliability and effectiveness of the support of the mounting beam 4 to the bottom plate 1, and improving the firmness and stability of the matching between the mounting beam 4 and the bottom plate 1.

In some embodiments of the present disclosure, as shown in FIG. 2, the connection assembly 5 includes a sleeve 51. The sleeve 51 includes a sleeve portion 511 and a bottom edge portion 512. The sleeve portion 511 passes through the mounting beam 4 along an up and down direction. The bottom edge portion 512 is connected to a lower end of the sleeve portion 511 and supported under the bottom beam portion 42. It should be noted herein that, that the bottom edge portion 512 is supported under the bottom beam portion 42 means that the bottom edge portion 512 is located under the bottom beam portion 42 to directly or indirectly support the mounting beam 4.

Therefore, the connection assembly 5 can simply and effectively match/couple the mounting beam 4 and provide an upward acting force for the mounting beam 4. In addition, the sleeve 51 includes the bottom edge portion 512 supported under the mounting beam 4, so that the reliability of the connection assembly 5 providing the upward acting force for the mounting beam 4 can be improved, thereby avoiding a problem of detachment of the connection assembly 5 from the mounting beam 4 due to its upward movement relative to the mounting beam 4, and improving the operation reliability and effectiveness of the connection assembly 5.

It should be noted that, in this embodiment, a relative position relationship between the sleeve 51 and the top plate 3 is not limited. For example, an upper end of the sleeve 51 may be located below the top plate 3. For another example, an upper end of the sleeve 51 may pass through the top plate 3 to be located above the top plate 3. In addition, in some embodiments of the present disclosure, the sleeve 51 may be directly connected to the mounting point in the application scenario, so that the battery pack 100 can be mounted to the mounting point in the application scenario. For example, the sleeve 51 may be connected to the mounting point in the application scenario by the interference fit, threaded connection, welding, or fixed connection with a connection member. In this case, a connection member 52 described below may be omitted.

In some embodiments of the present disclosure, as shown in FIG. 2, the sleeve 51 has a boss 513 inside, and the connection assembly 5 further includes a connection member 52. The connection member 52 includes a head portion 521 and a rod portion 522. The head portion 521 is connected to a lower end of the rod portion 522. The head portion 521 is supported under the boss 513. The rod portion 522 runs through the sleeve 51 and the top plate 3, and an upper end of the rod portion 522 is located above the top plate 3. In other words, the rod portion 522 passes upward through the sleeve 51 and the top plate 3. Therefore, the upper end of the rod portion 522 may be connected to a mounting point such as the vehicle body, thereby simply and effectively enabling the connection assembly 5 to be connected to the mounting point in the application scenario, allowing the connection assembly 5 to provide an upward acting force for the mounting beam 4.

It should be noted that, a type selection of the connection member 52 is not limited, which may be, for example, a bolt, a rivet, or a pin. In addition, it should be noted that, a structure of the boss 513 is not limited. For example, in the embodiment shown in FIG. 6, a two-stage staircase hole may be formed in the sleeve 51. The two-stage staircase hole includes an upper hole and a lower hole. An aperture of the upper hole is less than an aperture of the lower hole. A step surface formed between a lower end of the upper hole and an upper end of the lower hole constitutes/forms a lower surface of the boss 513. For another example (not shown in the figure), an annular boss may be further formed in the sleeve 51. An upper hole located above the annular boss, a lower hole located below the annular boss, and an annular hole defined by an inner ring of the annular boss are formed in the sleeve 51. Both an aperture of the upper hole and an aperture of the lower hole are greater than an aperture of the annular hole. A lower end face of the annular boss constitutes a lower surface of the boss 513.

For example, in the embodiment shown in FIG. 2, when the upper end of the rod portion 522 is connected to the vehicle body, under a downward acting force such as the self-gravity of the battery pack 100, the head portion 521 provides an upward acting force for the sleeve 51 through the boss 513. The sleeve 51 transfers the upward acting force to the bottom beam portion 42 of the mounting beam 4 through the bottom edge portion 512. The mounting beam 4 then transfers the upward acting force to the bottom plate 1 through the bottom beam portion 42. As the bottom plate 1 is used for supporting the battery core 2, the gravity of the battery core 2 and the upward acting force provided by the mounting beam 4 for the bottom plate 1 make the connection between the bottom plate 1 and the mounting beam 4 to be pressed tightly. In addition, the acting force of the sleeve 51 on the battery pack 100 is from the bottom to the top, that is, the sleeve 51 provides the acting force from the bottom of the battery pack 100, rather than providing an upward lifting force for the battery pack 100 from the top of the battery pack 100. Therefore, the top plate 3 is not subjected to an upward lifting force, avoiding a problem of separation between the top plate 3 and the battery core 2 due to stress concentration in a local area of the glue between the top plate 3 and the battery core 2.

It should be noted that, the connection member 52 is used for connecting the battery pack 100 to the mounting point in the application scenario, such as connecting the battery pack 100 to the frame in the vehicle body, to achieve the connection and fixation of the battery pack 100 to the whole vehicle. The connection member 52 may have no other connection relationship with the other components of the battery pack 100 other than passing through the sleeve 51. The battery pack 100 may be shipped separately without the connection member 52. The presence or absence of the connection member 52 does not affect sealing of the battery pack 100, thereby improving the sealing performance and the reliability of the battery pack 100.

In some embodiments of the present disclosure, as shown in FIG. 1, there may be multiple connection assemblies 5 arranged at intervals along a length direction of the mounting beam 4. Therefore, the stress can be distributed to reduce a force on each connection assembly 5, thereby further improving the operation reliability of the connection assembly 5.

For example, in the embodiment shown in FIG. 3, multiple mounting holes 40 may be formed at intervals in the mounting beam 4 along its length direction. Each mounting hole 40 runs/extends through the mounting beam 4 along the up and down direction, and each mounting hole 40 is fitted with one connection assembly 5, thereby simply and effectively assembling multiple connection assemblies 5, and ensuring that a position of each connection assembly 5 is reliable and effective. In other words, the assembly efficiency and the operation reliability of the connection assemblies 5 can be improved by using positioning and spacing of the mounting holes 40.

Figure 4:
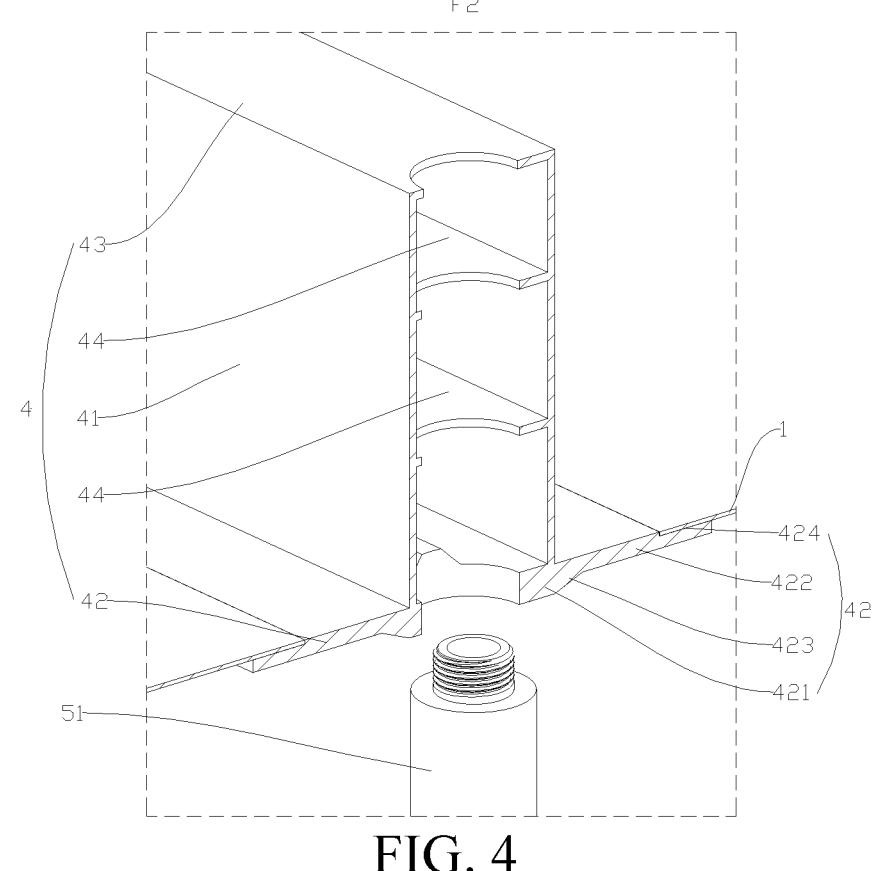
FIG. 4 is an enlarged view of F2 shown in FIG. 3.

In addition, in some embodiments of the present disclosure, as shown in FIG. 3 and FIG. 4, to achieve weight reduction, the mounting beam 4 may be a hollow beam, and reinforcing ribs 44 may be arranged/disposed in the hollow beam, so that not only the weight reduction can be achieved, but also the structural reliability of the mounting beam 4 can be ensured. For example, in the embodiment shown in FIG. 3 and FIG. 4, the reinforcing ribs 44 may extend along the length direction of the mounting beam 4, and the reinforcing ribs 44 may include multiple reinforcing ribs 44 arranged in the main beam portion 41 at intervals along the up and down direction.

In some embodiments of the present disclosure, as shown in FIG. 2 and FIG. 4, the bottom beam portion 42 includes a center portion 421 and an outer peripheral portion 422. The outer peripheral portion 422 is arranged surrounding the center portion 421. A thickness of the center portion 421 is greater than a thickness of the outer peripheral portion 422. The bottom edge portion 512 is supported/disposed under the center portion 421. In this way, on the one hand, a weight reduction requirement of the mounting beam 4 can be met, and on the other hand, the structural strength and stiffness of a main stress-bearing position of the mounting beam 4 can be improved, thereby avoiding a problem of deformation of the mounting beam 4 under stress.

In some embodiments of the present disclosure, as shown in FIG. 2 and FIG. 4, the bottom beam portion 42 further includes a transition portion 423. The transition portion 423 is connected between the center portion 421 and the outer peripheral portion 422. A thickness of the transition portion 423 gradually decreases in a direction from the center portion 421 to the outer peripheral portion 422. A top surface of the center portion 421 is flush with a top surface of the outer peripheral portion 422. A bottom surface of the center portion 421 is connected to a bottom surface of the outer peripheral portion 422 through a bottom surface of the transition portion 423 with a smooth transition.

In this way, it can be ensured that an upper surface of the bottom beam portion 42 is substantially flat, to ensure that multiple battery cores 2 above it can be arranged side by side at the same height. On the other hand, problems of sudden changes in a cross-section of the bottom beam portion 42 and fracture occurrence at the sudden changes due to the stress concentration can be avoided, thereby ensuring the structural reliability of the bottom beam portion 42.

In some embodiments of the present disclosure, with reference to FIG. 4, the bottom beam portion 42 has a recess 424 on a top surface at an outer edge of the bottom beam portion. An outer side face of the recess 424 is open, that is, the recess 424 is formed by recessing downward. In addition, a surface of a side of the recess 424 away from the center of the bottom beam portion 42 is open. The bottom plate 1 is lapped and fixed to an inner wall of the recess 424. It should be noted herein that, that the bottom plate 1 is lapped to the inner wall of the recess 424 means that part of the bottom plate 1 is lapped to the inner wall of the recess 424. That the bottom plate 1 is fixed to the inner wall of the recess 424 means that the bottom plate 1 is fixed with the inner wall of the recess 424. For example, the fixed connection relationship may be welding.

In this way, the recess 424 lapped to the bottom plate 1 is provided at the outer edge of the bottom beam portion 42, thereby facilitating welding of the bottom plate 1 to the bottom beam portion 42. For example, friction stir welding may be used to ensure that a welding effect does not adversely affect the battery pack 100, such as not producing exposed welds at the outer edge of the bottom beam portion 42. In addition, the recess 424 can be used to achieve an assembly and positioning effect, that is, before the welding, the recess 424 is used to rapidly achieve proper matching between the bottom beam portion 42 and the bottom plate 1. Certainly, the present disclosure is not limited thereto. In some embodiments of the present disclosure, the bottom beam portion 42 may not be provided with the recess 424.

In this case, the bottom plate 1 and the bottom beam portion 42 may be connected in other manners. Details are not described herein.

In some embodiments of the present disclosure, as shown in FIG. 1 and FIG. 3, the battery core 2 is arranged on each side of the mounting beam 4 in a width direction (an F2 direction shown in FIG. 1 is the width direction of the mounting beam 4). In other words, at least one battery core 2 is arranged on one side of the mounting beam 4, and at least one battery core 2 is arranged on the other side of the mounting beam 4, in the width direction. This shows that the mounting beam 4 is not located at a peripheral position of the battery pack 100. Therefore, the stability of the connection between the non-peripheral position of the battery pack 100 and the mounting point in the application scenario can be ensured, thereby alleviating a problem of the vibration of the battery pack 100 at the non-peripheral position relative to the mounting point in the application scenario.

It should be noted that, a quantity of mounting beams 4 is not limited, and there may be one or more mounting beams 4. When there is one mounting beam 4, quantities of battery cores 2 on both sides of the width of the mounting beam 4 may be or may not be equal. When there are multiple mounting beams 4, battery cores 2 are arranged on both lateral sides of each mounting beam 4, so that there are also battery cores 2 between two adjacent mounting beams 4.

In some embodiments of the present disclosure, as shown in FIG. 1 and FIG. 3, the battery pack 100 includes multiple side beams 6 arranged surrounding the bottom plate 1. The multiple side beams 6 are connected to the bottom plate 1 to form a tray 101. The multiple side beams 6 surround to form a frame. In other words, the battery pack 100 includes a tray 101, the tray 101 includes the bottom plate 1 and multiple side beams 6 located around the bottom plate 1, the multiple side beams 6 to form a frame, the frame is arranged surrounding the bottom plate 1, and both the battery core 2 and the mounting beam 4 are arranged inside the frame. This shows that the mounting beam 4 is not located at a peripheral position of the battery pack 100. Therefore, the stability of the connection between the non-side position of the battery pack 100 and the mounting point in the application scenario can be ensured, thereby alleviating a problem of the vibration of the battery pack 100 at the non-peripheral position relative to the mounting point in the application scenario.

For example, in an embodiment, there are four side beams 6. The four side beams 6 can form a square frame. The bottom plate 1 is located at the bottom of the square frame. There may be at least one mounting beam 4, located within the square frame defined by the surrounding side beams 6. This shows that the mounting beam 4 is not located at a peripheral position of the battery pack 100. Therefore, the stability of the connection between the non-peripheral position of the battery pack 100 and the mounting point in the application scenario can be ensured, thereby alleviating a problem of the vibration of the battery pack 100 at the non-peripheral position relative to the mounting point in the application scenario. Certainly, the present disclosure is not limited thereto. A quantity of side beams 6 is not limited to four. For example, there may be more than four or less than four side beams 6. In addition, the frame surrounded by the side beams 6 is not limited to a square frame, and may be, for example, a polygonal frame.

In some embodiments, when there is one mounting beam 4, the bottom plate 1 may include two sub-plates and the two sub-plates are respectively located on both sides of the width direction of the mounting beam 4 to facilitate the assembly. When there are multiple mounting beams 4 and the multiple mounting beams 4 are arranged at intervals along a first direction, the bottom plate 1 may include multiple sub-plates arranged at intervals along the first direction, and a quantity of sub-plates is one more than a quantity of mounting beams 4, so that it can be ensured that a sub-plate is arranged on each side of each mounting beam 4 in the width direction, and a sub-plate is located between two adjacent mounting beams 4. The first direction may be a length direction of the battery pack 100 or a width direction of the battery pack 100.

In some embodiments of the present disclosure, as shown in FIG. 1 and FIG. 3, the length direction of the mounting beam 4 is the length direction of the battery pack 100 (an F1 direction shown in FIG. 1 is the length direction of the battery pack 100). The width direction of the mounting beam 4 is the width direction of the battery pack 100 (the F2 direction shown in FIG. 1 is the width direction of the battery pack 100). The mounting beam 4 is located at the center of the battery pack 100 in the width direction. It should be noted that, a thickness direction of the mounting beam 4 and a thickness direction of the battery pack 100 are each an up and down direction (an F3 direction shown in FIG. 1). Therefore, the mounting beam 4 is a center longitudinal beam of the battery pack 100, so that the stability of the connection between a central position of the battery pack 100 and the mounting point in the application scenario can be improved, thereby alleviating a problem of the vibration of the central position of the battery pack 100 relative to the mounting point in the application scenario. In addition, a vibration resistance effect and overall structural stability of the battery pack 100 can be further improved by setting the mounting beam 4 as the center longitudinal beam.

Certainly, the present disclosure is not limited thereto. In some embodiments of the present disclosure, the length direction of the mounting beam 4 is the width direction of the battery pack 100. The width direction of the mounting beam 4 is the length direction of the battery pack 100. The mounting beam 4 is located at the center of the battery pack 100 in the length direction. In this case, the mounting beam 4 is a center transverse beam of the battery pack 100, so that the stability of the connection between a central position of the battery pack 100 and the mounting point in the application scenario can be improved, thereby alleviating a problem of the vibration of the central position of the battery pack 100 relative to the mounting point in the application scenario. In addition, a vibration resistance effect and overall structural stability of the battery pack 100 can be further improved by setting the mounting beam 4 as the center transverse beam.

The battery pack in the related art is generally fixed to the frame of the whole vehicle by lugs on side beams on both sides of the battery pack in the length or width direction. However, due to a long distance between the fixed points on both sides and a great weight of the battery pack, a middle portion of the battery pack is easy to vibrate up and down in a driving state, that is, an area with a longer distance from the fixed point has greater a vibration amplitude, and the vibration easily causes the structural damage or noise. However, in the battery pack 100 according to the embodiments of the present disclosure, the mounting beam 4 is arranged at a central position of the width of the battery pack 100 and extends along the length direction of the battery pack 100, and multiple connection assemblies 5 are arranged at intervals on the mounting beam 4 along the length direction of the mounting beam 4, so that the center portion of the battery pack 100 is connected to the frame of the vehicle body. In this way, the strength of the battery pack 100 and the whole vehicle can be effectively improved, the anti-extrusion strength of the frame of the whole vehicle is improved by using the battery pack 100, and a pack body vibration mode of the battery pack 100 is improved by using the frame, thereby avoiding the disadvantage of large vibration amplitude in the middle portion of the battery pack 100.

It should be noted that, all other compositions of the battery pack 100 according to the embodiment of the first aspect of the present disclosure may be configured with reference to a battery pack 100 of the embodiment of the second aspect described below, so that the battery pack 100 of the embodiment of the first aspect of the present disclosure may have a better performance. For example, in some battery packs 100 of the embodiment of the first aspect of the present disclosure, the connection assembly 5 may further include a nut 53, a first sealing member 54, a second sealing member 55, a third sealing member 56, and the like. Details are not described herein. In addition, assembly steps of the battery pack 100 according to the embodiment of the first aspect of the present disclosure may be performed with reference to assembly steps of the battery pack 100 of the embodiment of the second aspect below, and details are not described herein.

The battery pack 100 according to the embodiment of the second aspect of the present disclosure is described below with reference to the accompanying drawings.

Figure 5:
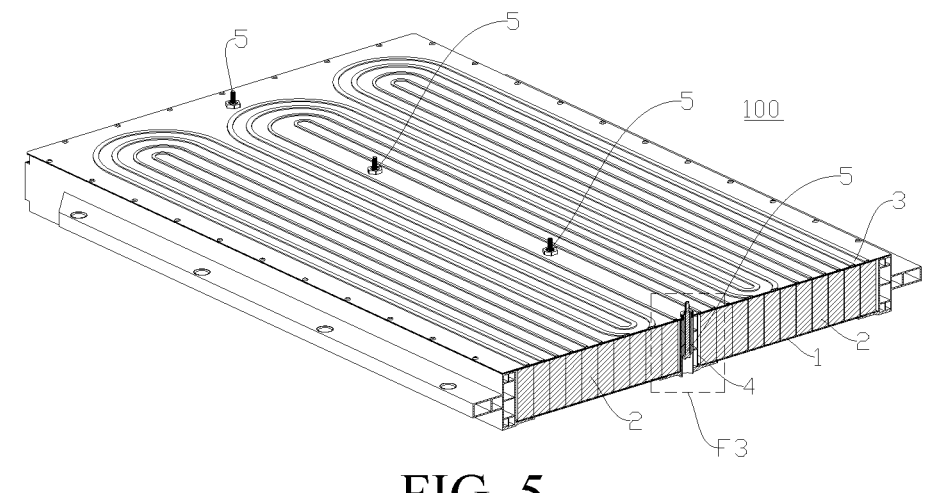
FIG. 5 is a sectional view of a battery pack according to another embodiment of the present disclosure.
Figure 6:
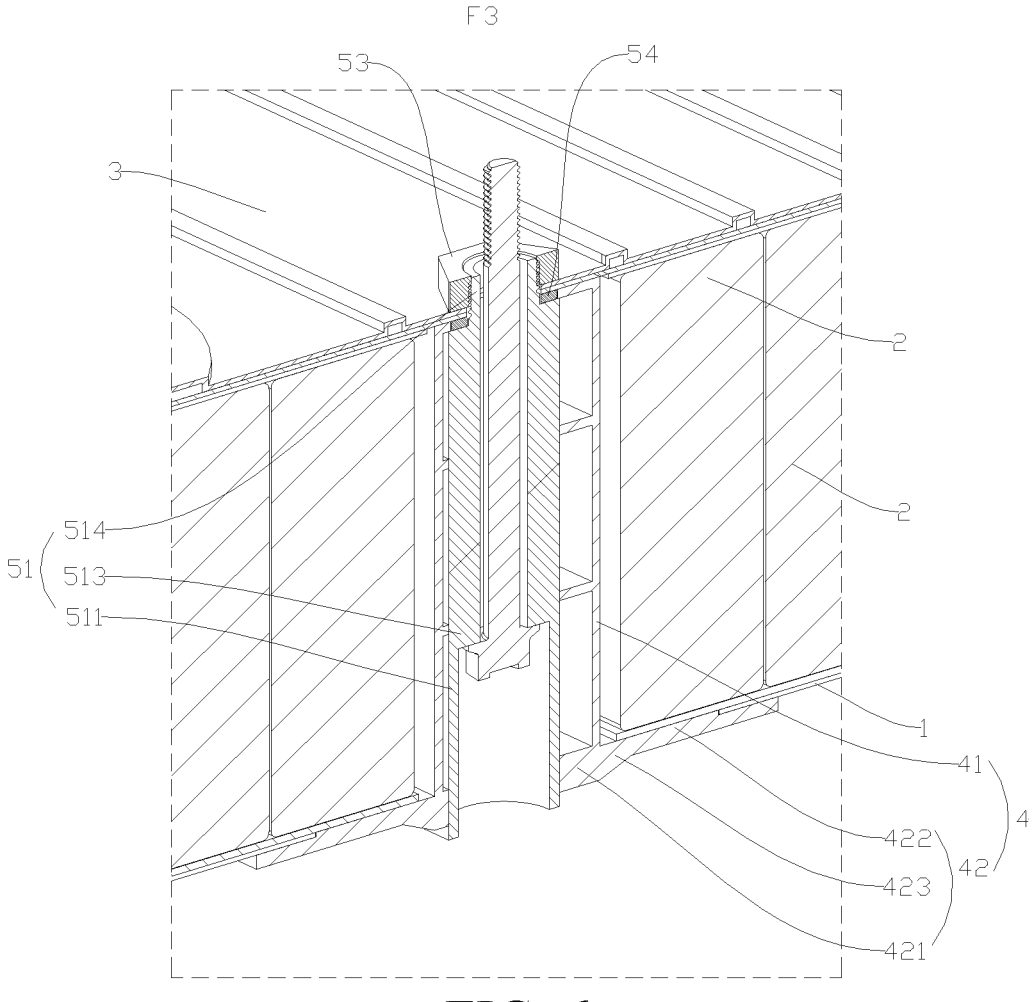
FIG. 6 is an enlarged view of F3 shown in FIG. 5.
Figure 7:
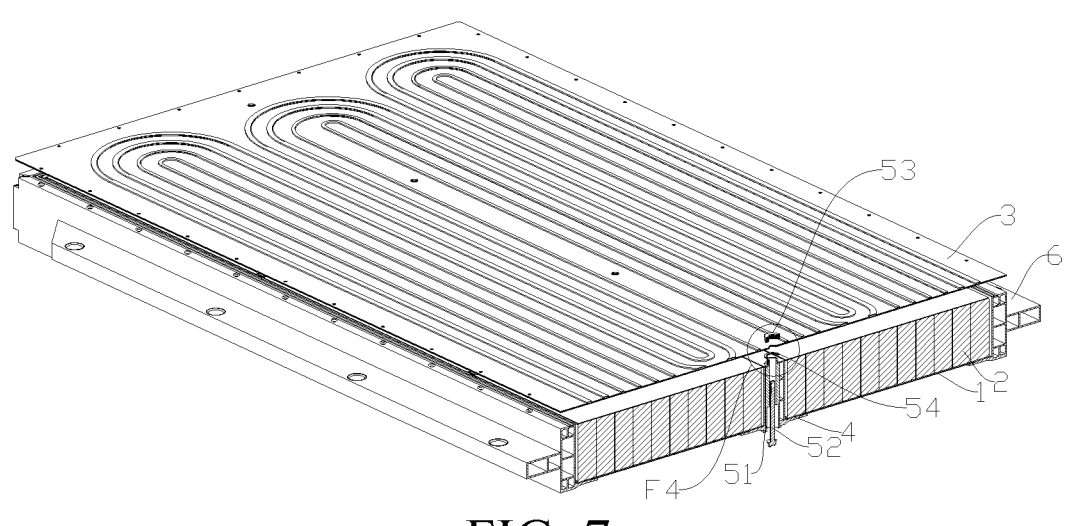
FIG. 7 is a sectional view of a battery pack according to another embodiment of the present disclosure.

As shown in FIG. 5 and FIG. 6, the battery pack 100 includes a bottom plate 1, a battery core 2, and a top plate 3. The battery core 2 is arranged above the bottom plate 1, and the top plate 3 is arranged above the battery core 2. In other words, the top plate 3 is located above the bottom plate 1, and the battery core 2 is located between the top of the bottom plate 1 and the bottom of the top plate 3. The bottom plate 1 is arranged under the battery core 2 to support the battery core 2. It should be noted that, the orientation terms "up" and "down" herein are based on mounting of the battery pack 100 in an application scenario. For example, when the battery pack 100 is mounted on a vehicle body 200 of a vehicle 1000, an up and down direction refers to an up and down direction or a vertical direction of the vehicle 1000, that is, the top of the vehicle 1000 is "up", and the bottom of the vehicle 1000 is "down".

In some embodiments of the present disclosure, as shown in FIG. 5 and FIG. 6, the battery pack 100 may further include a connection assembly 5. The connection assembly 5 is used for mounting the battery pack 100 to a mounting point in an application scenario. In other words, through the arrangement of the connection assembly 5, the battery pack 100 is connected to a mounting position in the application scenario. For example, when the battery pack 100 is applied to the vehicle 1000, the connection assembly 5 may be connected to the vehicle body 200 of the vehicle 1000. In this case, the mounting point is located on the vehicle body 200. However, it should be noted that, the application scenario of the battery pack 100 is not limited to the vehicle 1000, and there may be other application scenarios such as an unmanned aerial vehicle or an energy storage device.

In an embodiments, through the arrangement of the connection assembly 5, the battery pack 100 may be connected in the application scenario, so that mounting of the battery pack 100 is implemented or the mounting stability of the battery pack 100 is improved. For example, in some embodiments of the present disclosure, when the battery pack 100 is mounted to the vehicle 1000, the connection assembly 5 may be connected to a frame of the vehicle body 200. In this case, if the battery pack 100 is also connected to the vehicle body 200 through another mounting structure, the mounting stability of the battery pack 100 can be improved through the arrangement of the connection assembly 5. If the battery pack 100 is no longer connected to the vehicle body 200 through another mounting structure, lifting of battery pack 100 can be achieved through the arrangement of the connection assembly 5.

As shown in FIG. 5 and FIG. 6, the connection assembly 5 includes a sleeve 51 and a nut 53. The sleeve 51 includes a sleeve portion 511 and a connection portion 514. The sleeve portion 511 extends along an up and down direction (either vertically along the up and own direction or obliquely along the up and down direction) and is located below the top plate 3. That is, the sleeve portion 511 is limited below the top plate 3. In other words, due to its own and/or external structural limitations, the sleeve portion 511 cannot move upward out of the top plate 3 relative to the top plate 3. The connection portion 514 is connected to an upper end of the sleeve portion 511 and passes through the top plate 3, that is, at least part of the connection portion 514 is located above the top plate 3. It can be understood that, with reference to FIG. 8, the top plate 3 has an avoidance hole 30 that allows the connection portion 514 to pass through.

Figure 8:
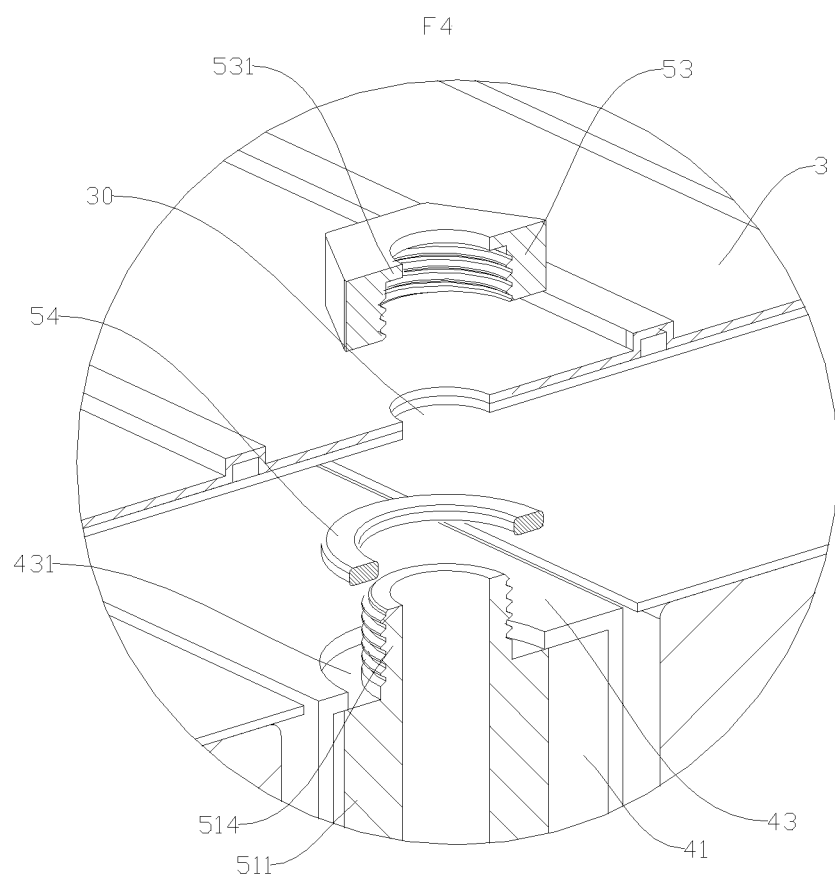
FIG. 8 is an enlarged view of F4 shown in FIG. 7.

As shown in FIG. 6 and FIG. 8, part of an outer peripheral surface of the connection portion 514 is located at least above the top plate 3 has external threads. The nut 53 is located above the top plate 3 and threaded on the outside of the connection portion 514 to limit the downward movement of the sleeve 51 relative to the top plate 3. It can be understood that, the nut 53 has internal threads on an inner circumferential surface, and the nut 53 can be threaded on an outer peripheral wall/surface of the connection portion 514 through the engagement of the interval threads and the external threads, so that matching/coupling between the nut 53 and the connection portion 514 can be simply and effectively achieved. In addition, the nut 53 stops against the top of the top plate 3, so that the sleeve 51 can be prevented from moving downward relative to the top plate 3.

In this way, according to the embodiment of the present disclosure, in the battery pack 100, at least part of the connection portion 514 protrudes above the top plate 3 and has the external threads on the outer peripheral surface, so that mounting of the nut 53 is more visible, allowing for simple, fast, and accurate assembly of the nut 53.

In the related art, the sleeve is located under the top plate as a whole and has internal threads, and a locking bolt with external threads is inserted downward from the top of the top plate to be engaged with the internal threads of the sleeve to prevent the sleeve from moving downward relative to the top plate. However, this makes it difficult to ensure that a center of an inner threaded hole at an upper end of the sleeve is opposite to a center of the avoidance hole in the top plate, making it difficult for the locking bolt to be quickly and accurately screwed into the inner threaded hole at the upper end of the sleeve after penetrating downward into the avoidance hole in the top plate, leading to a low assembly efficiency and easy damage to the internal treads at the upper end of the sleeve, resulting in a structural failure. However, in the battery pack 100 according to this embodiment of the present disclosure, the sleeve 51 has the connection portion 514 protruding above the top plate 3 and the connection portion 514 has external threads on the outer peripheral surface, so that mounting of the nut 53 is more visible, allowing the simple, fast, and accurate assembly of the nut 53.

In some embodiments of the present disclosure, as shown in FIG. 6 and FIG. 8, the connection assembly 5 further includes a first sealing member 54. An outer diameter of the sleeve portion 511 is greater than an outer diameter of the connection portion 514. The first sealing member 54 is sleeved on the connection portion 514 and sandwiched between the sleeve portion 511 and the top plate 3. In other words, the first sealing member 54 is located between (the upper end of) the sleeve portion 511 and the top plate 3 and surrounds the connection portion 514. In this way, the sealing performance of the battery pack 100 can be improved through the arrangement of the first sealing member 54. It can be understood that, to achieve the penetration of the connection portion 514 above the top plate 3, the avoidance hole 30 needs to be formed in the top plate 3 to make the battery pack 100 not sealed. Through the arrangement of the first sealing member 54 surrounding the connection portion 514 and located between the top plate 3 and the upper end of the sleeve portion 511, sealing at the avoidance hole 30 can be reliably achieved when the battery pack 100 is manufactured (that is, the battery pack 100 is not mounted to the whole vehicle). In addition, it can be understood that, after the nut 53 is tightened, the top plate 3 can be pressed against the first sealing member 54 to ensure a sealing effect.

Figure 9:
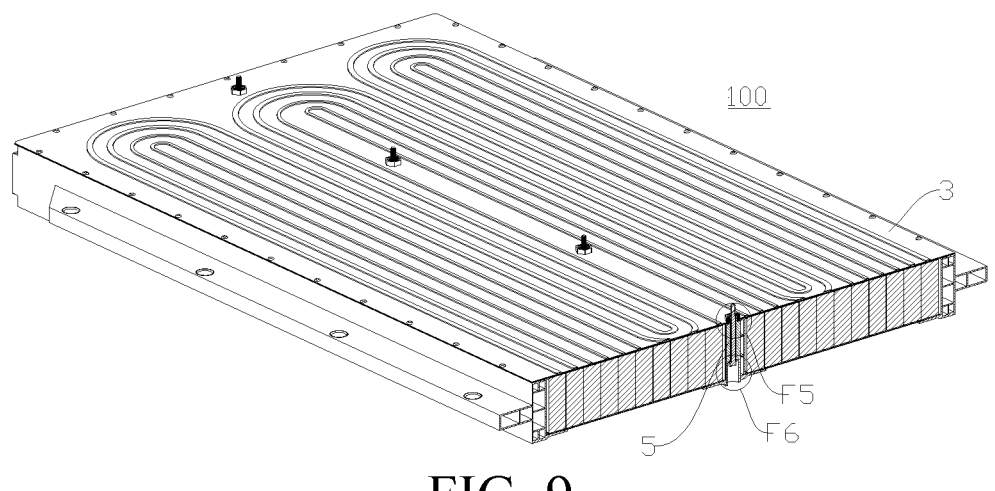
FIG. 9 is a sectional view of a battery pack according to another embodiment of the present disclosure.
Figure 10:
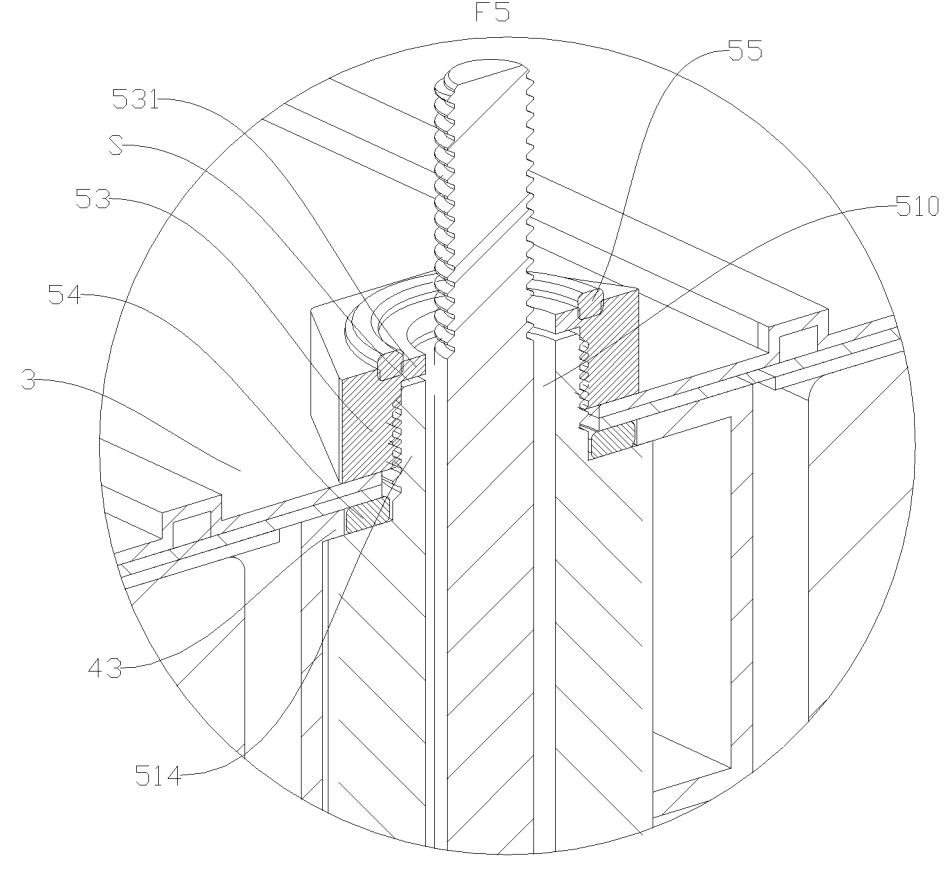
FIG. 10 is an enlarged view of F5 shown in FIG. 9.

In some embodiments of the present disclosure, as shown in FIG. 9 and FIG. 10, a shielding portion 531 is arranged at the top of the nut 53. The shielding portion 531 is annular and located above the connection portion 514 to shield a threaded joint between the connection portion 514 and the nut 53. In this way, the first sealing member 54 and the threaded joint between the nut 53 and the connection portion 514 can be shielded by the shielding portion 531 to form the protection to prevent external water droplets from dripping into the threaded joint between the nut 53 and the connection portion 514 and flowing into the first sealing member 54 to accumulate, thereby more effectively protecting the battery pack 100. It can be understood that, the battery pack 100 is generally in a salt spray environment, and the accumulated water is corrosive. Long-term contact of the first sealing member 54 with the accumulated water shortens a service life of the first sealing member 54 and affects the sealing of the battery pack 100.

In some embodiments of the present disclosure, as shown in FIG. 10, when an outer diameter of the sleeve portion 511 is greater than an outer diameter of the connection portion 514, the connection assembly 5 further includes the first sealing member 54, and the first sealing member 54 is sleeved over the connection portion 514 and sandwiched between an upper end of the sleeve portion 511 and a bottom surface of the top plate 3. There is a gap S between a bottom surface of the shielding portion 531 and a top surface of the connection portion 514 when the nut 53 abuts against the top plate 3. In this way, a compression amount of the first sealing member 54 can be ensured, preventing the bottom surface of the shielding portion 531 from being in contact with and stopping against the top surface of the connection portion 514 before the first sealing member 54 is compressed to an appropriate level, avoiding a problem of insufficient sealing level caused by an extremely small compression amount of the first sealing member 54, thereby improving the sealing effect. That is, after the nut 53 is tightened, there is still a gap S between the shielding portion 531 of the nut 53 and a top surface of the sleeve 51, to ensure that a tightening surface of the nut 53 remains in a plane of contact between a bottom surface of the nut 53 and a top surface of the top plate 3, thereby ensuring that the top plate 3 is pressed downward against the first sealing member 54 after the nut 53 is pressed against the top plate 3, to achieve the sealing between the top plate 3 and the sleeve 51.

In some embodiments of the present disclosure, as shown in FIG. 8 and FIG. 10, the battery pack 100 further includes a mounting beam 4. The mounting beam 4 includes a main beam portion 41 and a top beam portion 43. The main beam portion 41 and the top beam portion 43 are both located between the bottom plate 1 and the top plate 3. The top beam portion 43 is connected to an upper end of the main beam portion 41 and supported under the top plate 3. The top beam portion 43 has a matching hole 431. The sleeve portion 511 extends along an up and down direction and passes through the mounting beam 4. The upper end of the sleeve portion 511 is supported under the top beam portion 43. The connection portion 514 runs through the matching hole 431. The first sealing member 54 fits into the matching hole 431 and has an initial thickness greater than a thickness of the top beam portion 43, that is, during assembly, a part of the first sealing member 54 is located in the matching hole 431, and the remaining part extends out of the matching hole 431. After being assembled in place, the first sealing member 54 can be compressed to be completely located in the matching hole 431. In this way, a compression amount of the first sealing member 54 can be ensured, preventing a top surface of the sleeve portion 511 from stopping against a bottom surface of the top beam portion 43 before the first sealing member 54 is compressed to an appropriate level, avoiding a problem of insufficient sealing level caused by an extremely small compression amount of the first sealing member 54. In addition, when the first sealing member 54 is compressed to an appropriate level, the top surface of the sleeve portion 511 stops against the bottom surface of the top beam portion 43, thereby preventing an extremely large compression amount of the first sealing member 54 from causing permanent deformation of the first sealing member 54 and from even causing the first sealing member 54 to crack to result in problems such as sealing failure.

In other words, to ensure that the first sealing member 54 is compressed to an appropriate level, an initial thickness of the first sealing member 54 in a free state should be greater than a thickness of the top beam portion 43. After the nut 53 is locked so that the first sealing member 54 is compressed, the thickness of the first sealing member 54 after being stressed is equal to the thickness of the stop beam portion 43. In the present disclosure, the thickness of the first sealing member 54 after being compressed can be controlled by defining the thickness of the top beam portion 43. The compression amount of the first sealing member 54 has a relatively great correlation with the sealing performance of the first sealing member 54. An extremely small compression ratio of the first sealing member 54 may cause sealing failure. An extremely large compression ratio of the first sealing member 54 may cause the first sealing member 54 to form a crack and fail, or shorten a service life of the first sealing member 54.

In an embodiment of the present disclosure, to ensure an appropriate compression amount of the first sealing member 54, the nut 53 is locked to the connection portion 514 of the sleeve 51. The top plate 3 is pressed down through the nut 53, the top plate 3 is in contact with the mounting beam 4, and the mounting beam 4 and the sleeve 51 are welded as a whole. Before the nut 53 is tightened, a fitting surface between an upper end surface of the sleeve portion 511 and a bottom surface of the first sealing member 54 is lower in height than the bottom surface of the top beam portion 43. Through a height difference between the two surfaces, the compression amount of the first sealing member 54 can be ensured, thereby preventing an extremely large compression amount of the first sealing member 54 from causing permanent deformation of the first sealing member 54 (or even causing the first sealing member 54 to crack to result in sealing failure), and preventing an extremely small compression amount of the first sealing member 54 from causing an insufficient sealing level.

In some embodiments of the present disclosure, as shown in FIG. 10, the connection assembly 5 further includes a second sealing member 55. The second sealing member 55 is located at the top of the nut 53 and surrounds an inner hole of the nut 53 to achieve matching and sealing between the battery pack 100 and the corresponding mounting point in the application scenario. For example, in the embodiment shown in FIG. 10, when the nut 53 includes a shielding portion 531, the second sealing member 55 may be located at the top of the shielding portion 531.

In addition, to improve the matching reliability and effectivity of the second sealing member 55, in some embodiments of the present disclosure, a groove may be provided in the top of the nut 53. For example, in the embodiment shown in FIG. 10, a groove may be provided in a top surface of the shielding portion 531, so that a part of the second sealing member 55 is embedded in the groove. In this way, a compression amount of the second sealing member 55 can be limited by defining a groove depth of the groove.

The battery pack in the related art can achieve sealing of only the battery pack, and cannot achieve sealing of the connection between the battery pack and the frame of the whole vehicle. Threaded through holes need to be formed in the frame of the whole vehicle to be connected to fixing holes of the battery pack. The formation of the through holes in the frame may result in failure of sealing herein on the vehicle body. However, in the present disclosure, the sealing of the connection between the top of the battery pack 100 and the frame is achieved by adding the second sealing member 55 to an area of a fitting surface between the battery pack 100 and the frame. In other words, through the addition of the second sealing member 55 at the top of the nut 53, the second sealing member 55 at the top of the nut 53 can be compressed and fitted in a process of locking and fitting of the frame of the whole vehicle and the battery pack 100, thereby achieving the sealing between the top of the battery pack 100 and the frame.

In some embodiments of the present disclosure, as shown in FIG. 10, a top surface of the nut 53 is higher than a top surface of the top plate 3. It can be understood that, when the nut 53 includes a shielding portion 531, a top surface of the shielding portion 531 is the top surface of the nut 53. In this case, when the battery pack 100 is locked to the frame of the whole vehicle, a relative distance between the top plate 3 and the frame of the whole vehicle can be limited by the feature that at least part of the nut 53 is higher than (that is, protruding from) the top plate 3, to avoid a problem that the frame of the whole vehicle presses into the top plate 3 and causes deformation of the top plate 3, thereby effectively protecting the battery pack 100.

Figure 11:
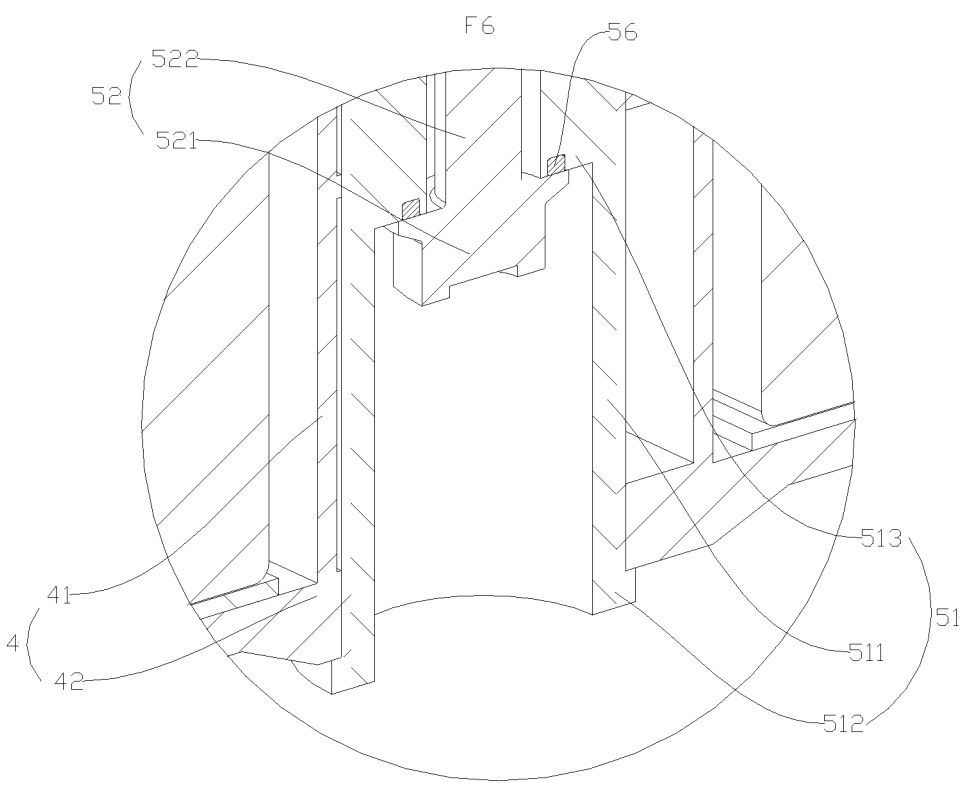
FIG. 11 is an enlarged view of F6 shown in FIG. 9.

In some embodiments of the present disclosure, as shown in FIG. 9 and FIG. 11, the sleeve 51 has a boss 513 inside. The connection assembly 5 further includes a connection member 52. The connection member 52 includes a head portion 521 and a rod portion 522. The head portion 521 is connected to a lower end of the rod portion 522. The head portion 521 is supported under the boss 513. The rod portion 522 runs upward through the sleeve 51, the top plate 3, and the nut 53. In other words, the rod portion 522 runs through the sleeve 51, the top plate 3, and the nut 53, and an upper end of the rod portion 522 is located above the nut 53. Therefore, the upper end of the rod portion 522 may be connected to a mounting point such as the vehicle body, thereby simply and effectively enabling the connection assembly 5 to be connected to the mounting point in the application scenario, and ensuring that the connection assembly 5 can provide an upward acting force for the mounting beam 4 under the downward acting force such as the self-gravity of the battery core 2. It should be noted that, a type selection of the connection member 52 is not limited, which may be, for example, a bolt, a rivet, or a pin. In addition, for other features and functions of the connection member 52 of this embodiment, refer to the description of the battery pack 100 of the embodiment of the first aspect above. Details are not described herein again.

In some embodiments of the present disclosure, as shown in FIG. 11, the connection assembly 5 may further include a third sealing member 56. The third sealing member 56 is sleeved over the rod portion 522 and sandwiched between the head portion 521 and the boss 513. In other words, the third sealing member 56 is located between (an upper end of) the head portion 521 and (a lower end of) the boss 513 and surrounds the rod portion 522. For example, the third sealing member 56 may be embedded in the boss 513 or the head portion 521. In this way, through the arrangement of the third sealing member 56, the sealing performance at the matching point between the connection member 52 and the sleeve 51 can be improved, thereby preventing water from pouring upwards from a cylinder chamber 510 of the sleeve 51 into the vehicle body.

In addition, through the arrangement of the second sealing member 55 and the third sealing member 56, complete sealing after the battery pack 100 is connected to the whole vehicle is achieved, thereby avoiding a case of sealing failure of the vehicle body after threaded holes that are formed in the frame of the whole vehicle are connected to the battery pack 100, and preventing water from entering the vehicle body when the vehicle is passing through water.

It should be noted that, all other compositions of the battery pack 100 according to the embodiment of the second aspect of the present disclosure may be configured with reference to the battery pack 100 of the embodiment of the first aspect described above, so that the battery pack 100 of the embodiment of the second aspect of the present disclosure have a better performance.

For example, in some battery packs 100 of the embodiment of the second aspect of the present disclosure, as shown in FIG. 11, the mounting beam 4 may further include a bottom beam portion 42. The bottom beam portion 42 is connected to a lower end of the main beam portion 41 and supported under the bottom plate 1. The sleeve 51 further includes a bottom edge portion 512. The bottom edge portion 512 is connected to a lower end of the sleeve portion 511 and supported under the mounting beam 4 to limit the sleeve portion 511 below the top plate 3. In this case, the mounting beam 4 is not completely located above the bottom plate 1, but includes the bottom beam portion 42 located under the bottom plate 1. Therefore, a point at which the mounting beam 4 exerts the acting force on the bottom plate 1 is not located above the bottom plate 1, but is located under the bottom plate 1. As a result, under the downward acting force such as the gravity of the battery core 2, the bottom plate 1 cannot be separated from the mounting beam 4, thereby improving the reliability of the support of the mounting beam 4 to the bottom plate 1, and improving the firmness and stability of the matching between the mounting beam 4 and the bottom plate 1.

In addition, the sleeve 51 includes the bottom edge portion 512 supported under the mounting beam 4, so that the sleeve 51 can simply and effectively match the mounting beam 4, and the reliability of the connection assembly 5 providing the upward acting force for the mounting beam 4 can be improved, thereby avoiding a problem of the detachment of the connection assembly 5 from the mounting beam 4 due to its upward movement relative to the mounting beam 4. In addition, through the arrangement of the bottom beam portion 42 and the bottom edge portion 512, the sleeve portion 511 can be simply and reliably limited below the top plate 3. Certainly, the present disclosure is not limited thereto. The sleeve portion 511 may be limited below the top plate 3, for example, by using an upper end surface of the sleeve portion 511 to stop against the bottom surface of the top plate 3. Details are not described herein.

Figure 12:
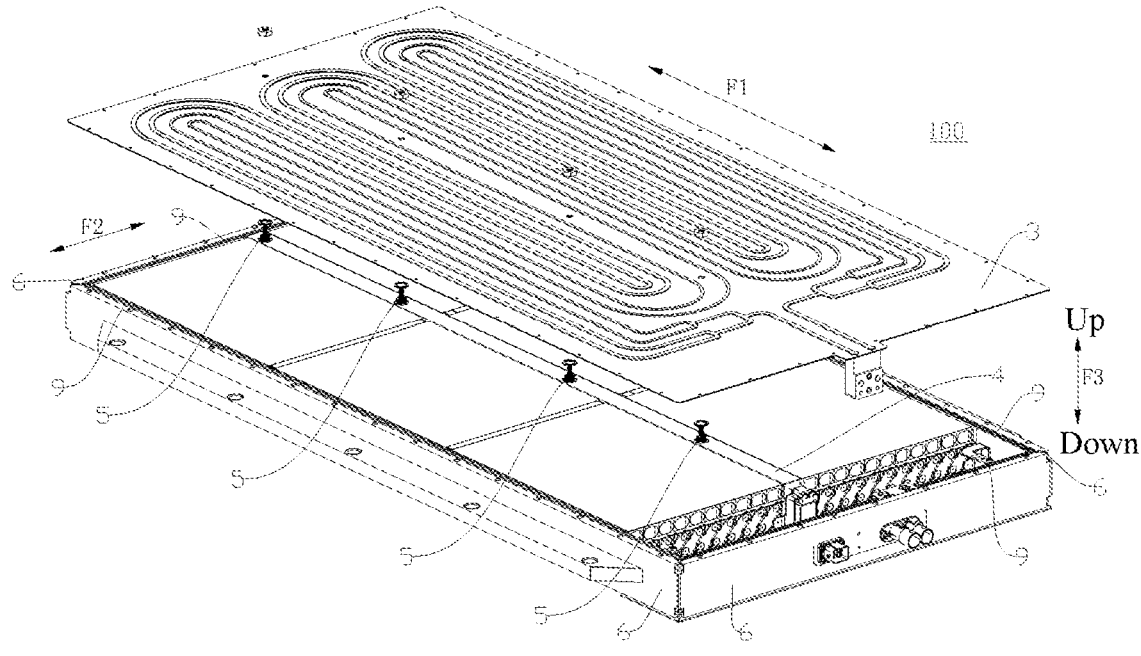
FIG. 12 is an exploded view of a battery pack according to an embodiment of the present disclosure.
Figure 13:
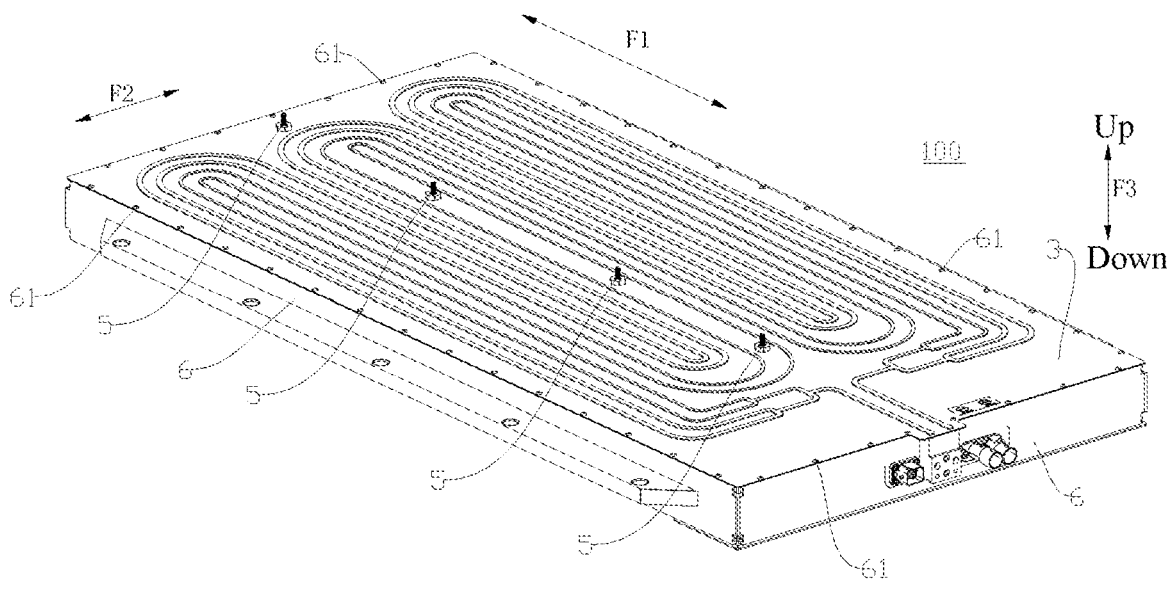
FIG. 13 is an assembly diagram of the battery pack shown in FIG. 12.

For example, in some embodiment of the second aspect of the present disclosure, in battery packs 100 as shown in FIG. 12 and FIG. 13, a length direction of the mounting beam 4 is a length direction of the battery pack 100 (an F1 direction shown in FIG. 12 is the length direction of the battery pack 100). A width direction of the mounting beam 4 is a width direction of the battery pack 100 (an F2 direction shown in FIG. 12 is the width direction of the battery pack 100). The mounting beam 4 is located at the center of the battery pack 100 in the width direction. It should be noted that, a thickness direction of the mounting beam 4 and a thickness direction of the battery pack 100 are each an up and down direction (an F3 direction shown in FIG. 12 is the thickness direction of the battery pack 100). Therefore, the mounting beam 4 is a center longitudinal beam of the battery pack 100, so that the stability of the connection between a central position of the battery pack 100 and the mounting point in the application scenario can be improved, thereby alleviating a problem of the vibration of the central position of the battery pack 100 relative to the mounting point in the application scenario. In addition, a vibration resistance effect and overall structural stability of the battery pack 100 can be further improved by setting the mounting beam 4 as the center longitudinal beam.

Other compositions and operations of the battery pack 100 according to the embodiment of the first aspect or the second aspect of the present disclosure are known to a person of ordinary skill in the art. Details are not described herein.

Assembly steps of the battery pack 100 according to the embodiment of the second aspect of the present disclosure are briefly described below.

With reference to FIG. 3 and FIG. 4, the tray 101 is prepared. The tray 101 includes one or more side beam 6 and a bottom plate 1. The mounting beam 4 is first mounted to the tray 101, and then the sleeve 51 is assembled with the mounting beam 4 from bottom to top. With reference to FIG. 2, the bottom edge portion 512 at the bottom of the sleeve 51 and a fitting surface of the bottom beam portion 42 of the mounting beam 4 are sealed at the bottom by arc welding, but the sealing is not limited thereto. For example, the sealing may be achieved by applying glue. Subsequently, with reference to FIG. 8, the first sealing member 54 is sleeved on the top of the sleeve 51. Next, referring to FIG. 2, after coated with the structural adhesive 7 at the bottom, the battery core 2 is placed into the tray 101 from top to bottom, the battery core 2 is fixed to the bottom plate 1 by glue, and the top of the battery core 2 is coated with the thermally conductive adhesive 8. With reference to FIG. 12, the top of the surrounding side beams 6 is coated with a sealant 9 annularly to achieve edge sealing between the tray 101 and the top plate 3. Then, the top plate 3 is assembled to the top of the battery core 2. The top plate 3 is bonded to the battery core 2 by the thermally conductive adhesive 8. With reference to FIG. 13, edges around the top plate 3 are fixed to the surrounding side beams 6 of the tray 101 by using rivets 61.

A vehicle 1000 according to an embodiment of a third aspect of the present disclosure is described below with reference to the accompanying drawings.

Figure 14:
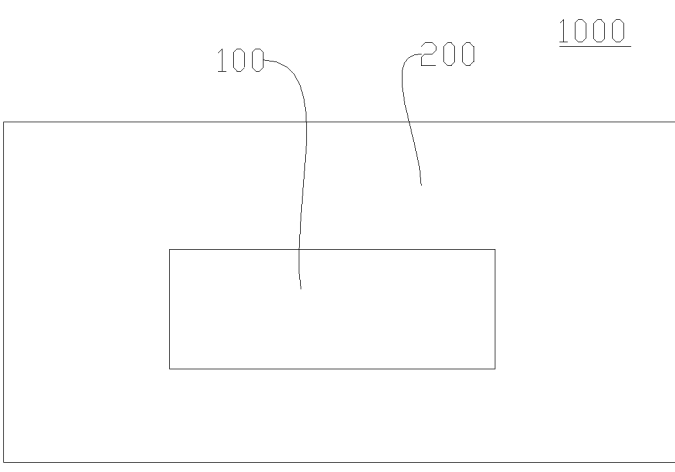
FIG. 14 is a schematic diagram of a vehicle according to an embodiment of the present disclosure.

As shown in FIG. 14, the vehicle 1000 includes a vehicle body 200 and a battery pack 100. The battery pack 100 is the battery pack 100 according to the embodiment of the first aspect or the second aspect of the present disclosure. The battery pack 100 is connected to the vehicle body 200 through the connection assembly 5. For example, it can be understood that the battery pack 100 is connected to a frame of the vehicle body 200 and the like. In this way, the overall performance of the vehicle 1000 can be improved through the arrangement of the battery pack 100 according to the embodiment of the first aspect or the second aspect of the present disclosure.

Other compositions and operations of the vehicle 1000 according to this embodiment of the present disclosure are known to a person of ordinary skill in the art. Details are not described herein.

In the description of this specification, the description with reference to the terms such as "one embodiment", "some embodiments", "an example", "a specific example", or "some examples" means that the features, structures, materials, or characteristics described with reference to the embodiment(s) or example(s) are included in at least one embodiment or example of the present disclosure. In this specification, the illustrative expressions of the above terms do not necessarily refer to a same embodiment or example. Moreover, the features, structures, materials, or characteristics described may be combined in a suitable manner in any one or more embodiments or examples. In addition, a person skilled in the art may combine different embodiments or examples described in this specification and characteristics of the different embodiments or examples without mutual contradiction.

Although the embodiments of the present disclosure have been shown and described, a person of ordinary skill in the art can understand that various changes, modifications, replacements, and variants may be made to these embodiments without departing from the principle and purpose of the present disclosure, and the scope of the present disclosure is subject to the claims and the equivalents of the claims.

What is claimed is:

1. A battery pack, comprising:

a battery core;

a bottom plate, wherein the bottom plate is disposed under the battery core to support the battery core;

a top plate, wherein the top plate is disposed above the battery core;

a mounting beam, wherein the mounting beam comprises a main beam portion and a bottom beam portion, the main beam portion is located between the bottom plate and the top plate, and the bottom beam portion is connected to a lower surface of the main beam portion and disposed under the bottom plate; and a connection assembly, wherein the connection assembly is configured for mounting the battery pack to a mounting point, and the connection assembly couples with the mounting beam to provide the mounting beam an upward acting force when the battery pack is mounted to the mounting point, wherein the connection assembly comprises: a sleeve, wherein the sleeve comprises a sleeve portion and a bottom edge portion, the sleeve portion passes through the mounting beam along a vertical direction, and the bottom edge portion is connected to a lower end of the sleeve portion and disposed under the bottom beam portion.

2. The battery pack according to claim 1, comprising a plurality of connection assemblies disposed at intervals along a length direction of the mounting beam, wherein the plurality of connection assemblies comprising the connection assembly.

3. The battery pack according to claim 1, wherein the sleeve comprises a boss, and the connection assembly further comprises:

a connection member, wherein the connection member comprises a head portion and a rod portion, the head portion is connected to a lower end of the rod portion, the head portion is disposed under the boss, the rod portion extends through the sleeve and the top plate, and an upper end of the rod portion extends above the top plate.

4. The battery pack according to claim 3, wherein the connection assembly further comprises a third sealing member, and the third sealing member is sleeved on the rod portion and sandwiched between the head portion and the boss.

5. The battery pack according to claim 1, wherein the connection assembly further comprises a first sealing member, and the sleeve comprises a connection portion, wherein the connection portion is connected to an upper end of the sleeve portion and passes through the top plate, an outer diameter of the sleeve portion is greater than an outer diameter of the connection portion, and the first sealing member is sleeved over the connection portion and sandwiched between the sleeve portion and the top plate.

6. The battery pack according to claim 5, wherein the connection assembly further comprises a nut located above the top plate, a part of an outer peripheral surface of the connection portion above the top plate comprises external threads, and the nut is threaded with the connection portion.

7. The battery pack according to claim 6, wherein the connection assembly further comprises a second sealing member, and the second sealing member is located at the top of the nut and surrounds an inner hole of the nut.

8. The battery pack according to claim 6, wherein a shielding portion is disposed at the top of the nut, and the shielding portion is annular and located above the connection portion.

9. The battery pack according to claim 1, wherein the bottom beam portion comprises a center portion and an outer peripheral portion, the outer peripheral portion is disposed surrounding the center portion, a thickness of the center portion is greater than a thickness of the outer peripheral portion, and the bottom edge portion is supported under the center portion.

10. The battery pack according to claim 9, wherein the bottom beam portion further comprises a transition portion, the transition portion is connected between the center portion and the outer peripheral portion, a thickness of the transition portion decreases in a direction from the center portion to the outer peripheral portion, a top surface of the center portion is flush with a top surface of the outer peripheral portion, and a bottom surface of the center portion is connected to a bottom surface of the outer peripheral portion through a bottom surface of the transition portion.

11. The battery pack according to claim 1, wherein the mounting beam further comprises a top beam portion, the top beam portion is connected to an upper end of the main beam portion and disposed under the top plate, the sleeve portion extends along the vertical direction and passes through the mounting beam, and the upper end of the sleeve portion is disposed under the top beam portion.

12. The battery pack according to claim 1, wherein the battery core is disposed on each side of the mounting beam in a width direction of the mounting beam.

13. The battery pack according to claim 12, wherein the battery pack comprises a plurality of side beams disposed surrounding the bottom plate, the side beams are connected to the bottom plate to form a tray, the side beams form a frame, and the battery core and the mounting beam are disposed inside the frame.

14. The battery pack according to claim 1, wherein the battery core is bonded to the bottom plate.

15. The battery pack according to claim 1, wherein the top plate is a cold plate and is bonded to the battery core.

16. The battery pack according to claim 1, wherein the mounting beam comprises a hollow beam and reinforcing ribs, wherein the reinforcing ribs are disposed in the hollow beam, extend along a length direction of the mounting beam, and are disposed in the main beam portion at intervals along a vertical direction.

17. The battery pack according to claim 1, wherein the bottom beam portion has a recess on a top surface at an outer edge of the bottom beam portion, and the bottom plate is disposed on and fixed to the recess.

18. A vehicle, comprising: a vehicle body and a battery pack, wherein the battery pack comprises:

a battery core;

a bottom plate, wherein the bottom plate is disposed under the battery core to support the battery core;

a top plate, wherein the top plate is disposed above the battery core;

a mounting beam, wherein the mounting beam comprises a main beam portion and a bottom beam portion, the main beam portion is located between the bottom plate and the top plate, and the bottom beam portion is connected to a lower surface of the main beam portion and disposed under the bottom plate; and a connection assembly, wherein the connection assembly is configured for mounting the battery pack to a mounting point, and the connection assembly couples with the mounting beam to provide the mounting beam an upward acting force when the battery pack is mounted to the mounting point, wherein the connection assembly comprises: a sleeve, wherein the sleeve comprises a sleeve portion and a bottom edge portion, the sleeve portion passes through the mounting beam along a vertical direction, and the bottom edge portion is connected to a lower end of the sleeve portion and disposed under the bottom beam portion; and the connection assembly is connected to the vehicle body.

\* \* \* \* \*